UNITED STATES PATENT OFFICE.

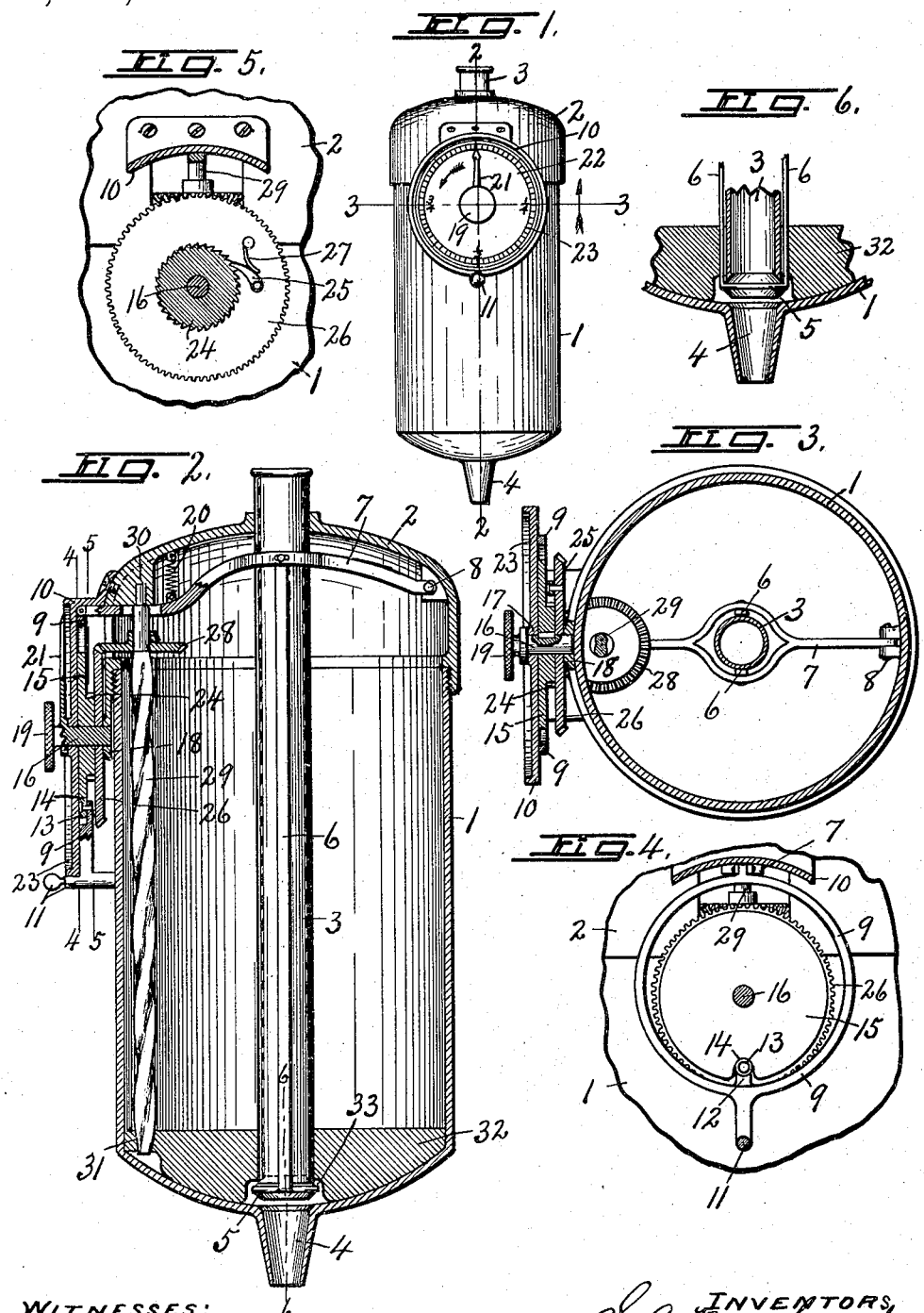

STEPHEN A. MISCHANSKY AND MICHAEL PAWLOWSKI, OF SYRACUSE, NEW YORK; SAID MISCHANSKY ASSIGNOR TO SAID PAWLOWSKI.

LIQUID-MEASURING APPARATUS.

1,156,244.  Specification of Letters Patent.  Patented Oct. 12, 1915.

Application filed September 24, 1914. Serial No. 863,271.

*To all whom it may concern:*

Be it known that we, STEPHEN A. MISCHANSKY and MICHAEL PAWLOWSKI, subjects of the Emperor of Austria-Hungary, and residents of Syracuse, in the county of Onondaga, in the State of New York, have invented new and useful Improvements in Liquid-Measuring Apparatus, of which the following, taken in connection with the accompanying drawings, is a full, clear, and exact description.

This invention relates to certain improvements in liquid measuring apparatus, the main object of which is to accurately measure and automatically discharge any predetermined quantity of liquid as determined by an external indicator adapted to be set by the operator.

Another object is to render the apparatus easily portable, simple in construction and efficient in operation so that it may be used in any relation where it is desired to transfer predetermined quantities of liquid from one receptacle to another.

Other objects and uses relating to specific parts of the device will be brought out in the following description.

In the drawing—Figure 1 is a front elevation of a liquid measuring device embodying the various features of my invention. Figs. 2 and 3 are enlarged vertical and horizontal sectional views taken respectively on lines 2—2 and 3—3, Fig. 1. Figs. 4 and 5 are detail vertical sectional views taken respectively in the planes of lines 4—4 and 5—5, Fig. 2. Fig. 6 is a detail vertical sectional view through the lower portion of the device taken in the plane of line 6—6, Fig. 2.

The apparatus shown comprises a cylindrical liquid receiver —1— having a removable cap —2—, an inlet conduit —3— and an outlet —4—, the inlet conduit —3— being secured centrally in the cap —2— and extended downwardly to a point in proximity to the bottom of the receiver, while the outlet —4— is located centrally in said bottom in vertical alinement with the inlet —3—, so that both inlet and outlet may be controlled by a double valve —5— playing between valve seats on the adjacent ends of said inlet and outlet. This valve is supported by upwardly extending rods —6— having their upper ends pivotally connected to a vertically rocking lever —7—, having one end pivoted at —8— to the interior of one side of the cap —2— at one side of the inlet —3— and its opposite end pivotally connected to the upper end of the vertically disposed locking ring —9— at the opposite side of the inlet tube —3—. This locking ring is located within a suitable housing —10— on the front side of the upper end of the receiver —1— and is provided on its lower side with a pendent operating handle —11— and an upwardly projecting lug —12— carrying a roller —13— normally interlocked in a notch —14— in the periphery of a circular disk —15— which is also located within the housing —10— and is preferably secured to a co-axial shaft or spindle —16—, the latter being journaled in suitable bearings —17— and —18— and is provided with an external hand-piece —19— by which it together with the disk —15— may be rotated by hand for a purpose hereinafter described.

A spring —20— is connected at one end of the lever —7—, and at its other end to the cap —2— and serves to normally elevate said lever for simultaneously closing the valve —5— against its seat on the lower end of the inlet —3— and also to normally hold the locking member —12— in interlocking engagement in the notch —14— of the disk —15—.

The handle —11— of the locking ring —9— extends through an opening in the bottom of the housing —10— and to the front side thereof where it is easily accessible to the operator to permit said ring and also the lever —7— and valve —5— to be drawn downwardly against the action of the spring —20— for opening the valve —5— from the inlet —3— and closing it against the outlet —4—. The spindle —16— is also provided with an index finger or pointer —21—, which is movable around a circular dial —22— on the front face of the housing —10— to register with any one of a series of graduations —23— representing different quantities of liquid which it is desired to measure and discharge from the receiver —1—, it being understood, however, that the spindle —16— and index finger —21— is normally held in its zero position by the engagement of the locking member —12— in the notch —14— of the disk —15—, and can only be adjusted rotarily after the locking member —12— has been withdrawn from its locking position by the downward movement of the locking ring —9—, by means of the hand-piece —11—, whereupon, the turning movement of the index finger will cause the corresponding turning movement of the disk —15— to shift the notch —14— to one side of the locking member —12—, thus causing the roller —13— to ride upon the periphery of said disk and thereby hold the valve —5— open from the inlet and closed against the outlet to allow the entrance of the liquid through the inlet into the interior of the receiver.

The rise of the liquid within the receiver is utilized to actuate suitable mechanism presently described for rotating the disk —15— until its notch —14— is again registered with the locking member —12— to allow said locking member to again assume its normal locking position by permitting the spring —20— to return the lever —7— and valve —5— to their normal positions for closing the inlet and opening the outlet to discharge the liquid from the receiver. For this purpose the spindle —16— is provided with a ratchet wheel —24— rigidly thereon adapted to be engaged by a pawl —25— which is pivoted to the adjacent face of a bevel gear —26— and is yieldingly held against the spring of the ratchet —27— also on the gear. This bevel gear is loosely mounted on the spindle —16— in close proximity to the inner face of the ratchet wheel —24— and meshes with a somewhat similar bevel gear —28— on the upper end of an upright screw spindle —29— shown more clearly in Fig. 2. This spindle —29— is preferably located within the receiver —1— near the front side thereof, its upper end being journaled in a bearing —30— in the cap —2— while its lower threaded end is engaged in a threaded aperture —31— in the corresponding side of a piston —32—. This piston preferably consists of a circular float fitted to slide easily within the receiver —1— by the rise and fall of the liquid therein, it being provided with a central opening for receiving the inlet tube —3— and valve operating rods —6—, while the central portion of the underside thereof is chambered out at —33— to receive the valve —5— when the piston is in its extreme downward position against the bottom of the receiver.

The screw thread of the spindle —29— is of sufficiently coarse pitch to allow it to be rotated by the rise and fall of the piston, thereby imparting similar rotary movement to the gears —28— and —26— and also to rotate the spindle —16— carrying the disk —15— and index finger —21— while the piston is being elevated by the inflowing liquid.

The interior diameter of the locking ring —9— is sufficiently larger than the exterior diameter of the disk —15— to allow the locking member —12— to be withdrawn from the notch —14— by the downward movement of said ring.

The operation of the device is as follows: The valve —5— is normally closed against the lower end of the inlet —3—, thereby opening the outlet —4— at which time the index finger —21— is at its zero position and the locking member —12— is in locking engagement with the notch —14— to hold these movable parts in their normal positions, the receiver being empty and the piston in its extreme lower position, as shown in Fig. 2. Now, in order to measure the quantity of liquid which is to be transferred from one receptacle to another through my improved measuring device, the locking member —12— is first withdrawn downwardly from its locking position by means of the handle —11—, immediately following which operation, the spindle —16— is turned to the left of Fig. 1 by means of the hand-piece —19— until the index finger is registered with the graduation representing the quantity of liquid which is to be passed through and measured in the receptacle —1—; as for example; the index finger may be registered with the graduation ¾ representing that fraction of a gallon or other liquid quantity which it is desired to transfer from one receptacle to another. As soon as the index finger is set to the desired graduation, the locking member —12— is released but will be held against returning to its locking position by the engagement of the roller —13— with the periphery of the disk —15— at one side of the notch which in the instance cited will be turned to the right a quarter turn, it being understood that during this operation the teeth of the ratchet wheel —24— will ride freely under the pawl —25— and that the valve —5— will be opened from the inlet and closed against the outlet. The liquid may now be introduced into the interior of the receiver through the tube —3—, and as the level of the liquid rises in said receiver the float piston —32— is raised, thereby rotating the screw shaft —29— and gear —28— to transmit rotary motion to the gear —26— in the contrary direction to that in which the disk —15— was previously rotated in the setting operation which causes the pawl —25— to engage the teeth of the ratchet wheel —24—, thus rotating the disk —15— until the notch —14— is again registered with the locking member —12—, whereupon said locking member will be instantly forced to its locking position to stop further rotation of the disk and its actuating mechanism, and at the same time, returning the valve —5— to its normal position to cut off the further supply of the liquid to the interior of the receptacle and open the outlet for discharging the liquid therefrom.

What we claim is:

1. A liquid measuring device comprising a liquid receiver having an inlet and an outlet and co-axial valve seats therefor, a valve controlling both the inlet and outlet and normally closing the inlet, means operable at will for setting the valve to close the outlet and open the inlet to allow the flow of liquid into the receiver, means adjustable from a normal position for holding the valve in the last named position while a predetermined quantity of liquid is entering the receiver, and means actuated by the inflowing liquid for restoring the holding means to its normal position and allowing the valve to close the inlet and open the outlet when such predetermined quantity has entered the receiver.

2. In a liquid measuring device of the character described, a liquid receiver having an outlet in one end and an inlet tube extending from the opposite end to a point in proximity to the outlet and in registration therewith, a valve coöperating with the adjacent ends of the inlet and outlet to control the inlet and outlet of liquid, means normally holding the valve in position to close the inlet, additional means operable at will to shift the first named means to open the valve from the inlet and to close it against the outlet, a detent operable at will to hold the last named means against return to its normal position while liquid is entering the receiver, and means actuated by the rise of the liquid in the receiver for tripping the detent and allowing the valve to return to its normal position only after a predetermined quantity of liquid has entered the receiver.

3. In a liquid measuring device of the character described, a liquid receiver having an inlet and an outlet, a valve mechanism controlling both inlet and outlet and normally closing the inlet, mechanism including coöperating locking members for holding the valve in its normal position, one of said locking members being movable from its locking position to open the valve from the inlet and close it against the outlet, the other locking member being adjustable relatively to the first named locking member to hold the later in its released position, and means actuated by the rise of liquid in the receiver for restoring the second named locking member to its normal position and permitting the restoration of the first named locking member to its normal position for opening the valve from the outlet and closing it against the inlet.

4. In a liquid measuring apparatus, a receiver having an inlet conduit therein extending from the top to a point in proximity to the bottom and an outlet in the bottom, the lower end of the inlet conduit and outlet being provided with co-axial valve seats, a valve coöperating with said seats to control the inlet and outlet of the liquid and normally closing the inlet, means operable at will for setting the valve to close the outlet and open the inlet, means adjustable at will and coöperating with the setting means for temporarily holding the latter in its set position to allow the liquid to enter the receiver, a float actuated by said inflowing liquid, means operated by the float for shifting the holding means from its holding position, and thereby releasing the valve-setting means, and means for restoring the valve and its setting means to their normal positions when released.

5. In a liquid measuring apparatus, in combination with a liquid receiver having an inlet and an outlet and co-axial valve seats therefor, a valve coöperating with said seats to control the inlet and outlet of the liquid to and from the receptacle and normally closing the inlet, self-retracting means operable at will for setting the valve to open the inlet and close the outlet, means adjustable at will and coöperating with the valve-setting means for temporarily holding the latter in its adjusted position to allow the liquid to enter the receiver, a float in the receiver actuated by the rise of liquid therein, and means actuated by the float for shifting the holding means from its holding position and thereby releasing the valve-setting means to allow the valve to close the inlet and open the outlet.

6. In a liquid measuring apparatus, a receiver for the liquid having an inlet and an outlet, a valve controlling said inlet and outlet and normally closing the inlet, self-retracting means operable at will for setting the valve to close the outlet and open the inlet to allow the liquid to enter the receiver, a float in the receiver actuated by the rise of liquid therein, movable means for temporarily holding the valve-setting means in its set position, and float-operated means for shifting the holding means from its holding position including a rotary spirally threaded member engaging a threaded portion of the float.

7. In a liquid measuring apparatus, a liquid receiver having an inlet, a valve for the inlet, self-retracting means operable at will for opening the valve, but normally closing the same, a rotary disk coöperating with said means and adjustable at will from a normal position to hold the valve open, a float, and means actuated thereby for restoring the disk to its normal position to permit the valve to close.

8. In a liquid measuring apparatus, a liquid receiver having an inlet, a valve for the inlet, self-retracting means operable at will for opening the valve, but normally closing the same, a rotary disk coöperating with said means and adjustable at will from a normal position to hold the valve open, a float and means actuated thereby for restoring the disk to its normal position to permit the valve to close, a dial, and an index finger connected to the dial to rotate therewith and movable around the dial to indicate the degree of adjustment of the disk.

9. In a liquid measuring apparatus, a liquid receiver having an inlet, a valve for the inlet, self-retracting means operable at will for opening the valve, but normally closing the same, a rotary disk coöperating with said means and adjustable at will from a normal position to hold the valve open, a float, a spiral shaft actuated by the float, and means actuated by the shaft for restoring the disk to its normal position and permiting the valve to close.

10. In a liquid measuring apparatus, a liquid receiver having an inlet, a valve for the inlet, operating means for the valve, rotatably adjustable means operable at will from a normal position and coöperating with the first-named means for opening the valve, a float, a spiral shaft operated by the float, and means actuated by the spiral shaft for restoring the second-named means to its normal position to permit the valve to close.

11. In a liquid measuring apparatus, a liquid receiver having an inlet, and a co-axial outlet, a valve controlling said inlet and outlet, self-retracting means for operating the valve to normally close the inlet and adjustable at will to open the inlet and close the outlet, a dial on one side of the receiver, a rotary spindle co-axial with the dial and adjustable at will about its axis, an index finger secured to the spindle and movable around the dial, a circular disk also secured to the spindle and provided with a notch in its periphery, said valve-operating means having a locking member normally engaged in said notch to permit the valve to close and to hold the disk in a normal position, said disk being adjustable from its normal position when the valve-operating means is adjusted to open the valve, thereby causing the locking member to ride against the periphery of the disk, a float within the receiver operated by the rise of liquid therein when the valve is opened, a spiral shaft rotated by the float, and means actuated by the shaft for restoring the disk to its normal position to allow the valve to close the inlet for cutting off the supply of liquid to the receiver.

In witness whereof we have hereunto set our hands this 21st day of September, 1914.

STEPHEN A. MISCHANSKY.
MICHAEL PAWLOWSKI.

Witnesses:
H. E. CHASE,
ALICE M. CANNON.

Copies of this patent may be obtained for five cents each, by addressing the "Commissioner of Patents, Washington, D. C."